Sept. 15, 1942.  W. L. LEWIS  2,295,907
FLEXIBLE EXHAUST PIPE JOINT
Filed Oct. 9, 1940
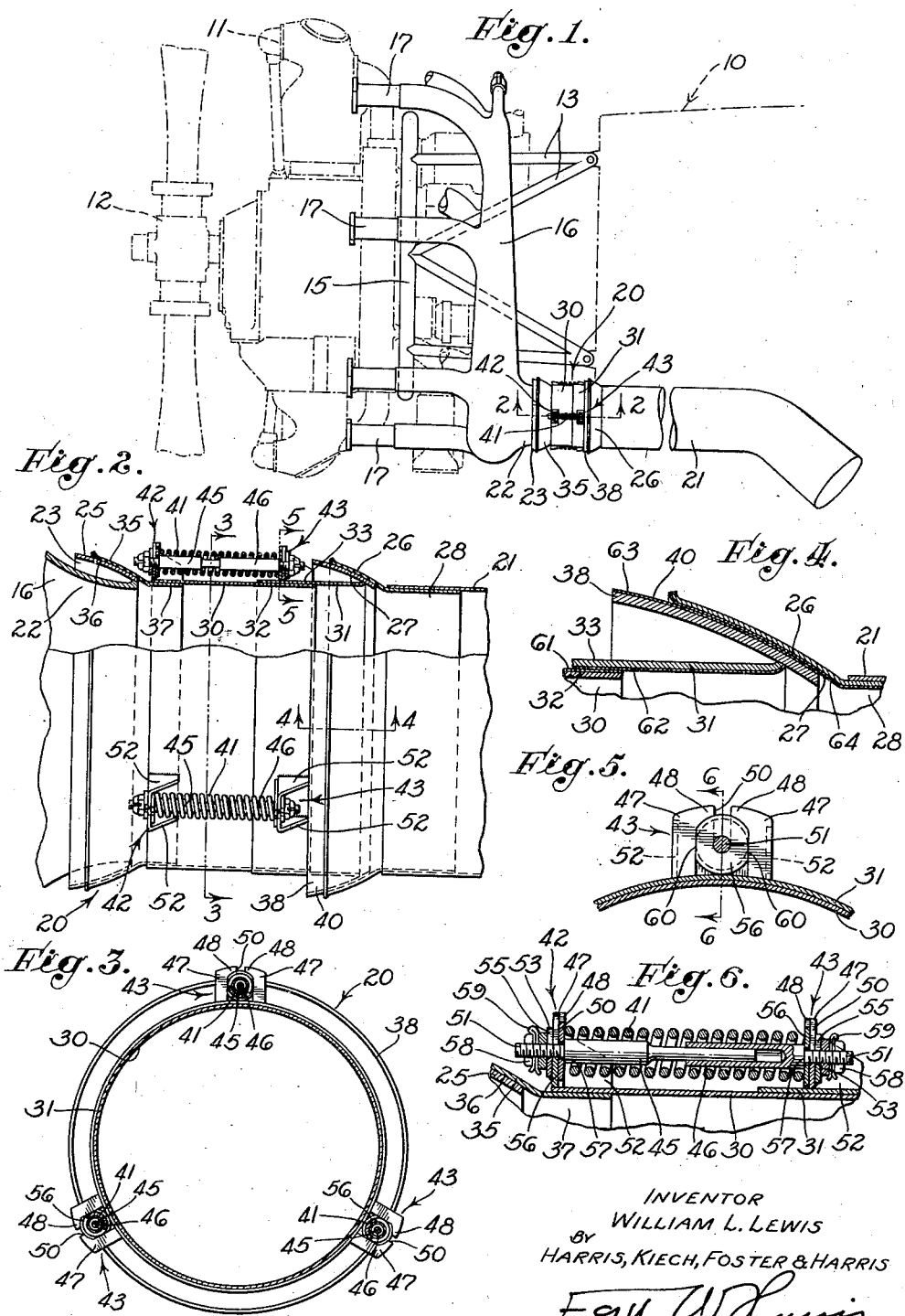
INVENTOR
WILLIAM L. LEWIS
BY
HARRIS, KIECH, FOSTER & HARRIS
ATTORNEYS.

Patented Sept. 15, 1942

2,295,907

UNITED STATES PATENT OFFICE 2,295,907

FLEXIBLE EXHAUST PIPE JOINT

William L. Lewis, Glendale, Calif., assignor to Hughes Tool Company, Houston, Tex., a corporation of Delaware Application October 9, 1940, Serial No. 360,359

2 Claims. (Cl. 285—11)

My invention relates to pipe joints with special reference to exhaust pipes for internal combustion engines, and is directed specifically to a flexible exhaust-pipe joint for aircraft.

Aircraft engines are commonly mounted in a resilient or floating manner to permit engine vibration to be dissipated instead of transmitted directly to the main aircraft structure. A portion of the exhaust system is, of course, mounted directly on the engine to move with the engine relative to the aircraft structure, but the major portion of the exhaust system may be fixed to the aircraft structure not only because it is usually necessary to carry the exhaust gases a substantial distance rearward from the power plant, but also because exhaust ducts are commonly incorporated in heating combinations and other devices that are rigidly mounted on the aircraft structure. The need arises, then, for a flexible joint to interconnect that portion of an exhaust duct that is carried by the vibrating engine and the continuing portion of the exhaust duct that is rigid relative to the aircraft proper.

To minimize fire hazard and prevent the accumulation of obnoxious and lethal gases in the aircraft, such a joint must be substantially gas-tight, and also act as a fire seal. A gas-tight flexible joint effective for such service is not easily attained. The exhaust gas is above atmospheric pressure and pulsates in a forceful manner that favors leakage. The high temperature of the exhaust not only expands the interconnected elements of the joints, but also tends to break down many sealing elements that might be employed. Acids and other corrosive high temperature products of combustion present serious problems. Finally, flexibility in such a joint is usually achieved by employing overlapping friction surfaces where leakage might occur, especially since the surfaces are in continual relative movement to accommodate the changes in angular and spatial relationships between the movable and fixed portions of the exhaust duct.

With the advent of larger and more powerful aircraft engines, the problem of avoiding intolerable leakage between the relatively movable surfaces of flexible exhaust joints has become exceedingly difficult to solve. The larger and more powerful engines have larger amplitudes of vibration so that the range of angles that must be accommodated by a short-coupled joint is greatly increased. Because of the larger engines, the exhaust pipes must be of relatively large diameter, a fact that further favors leakage in a flexible joint.

All metals and coatings within my knowledge heretofore employed for the relatively movable surfaces of such flexible joints have either galled from friction alone or have roughened to an inoperative degree because of friction, together with high temperature in the presence of the corrosive constituents of the exhaust. All steel alloys tried, including stainless steel, gall badly in a short time even if highly polished. Cadmium, zinc, copper and nickel coatings either gall promptly or completely break down from corrosive action and high temperatures.

The general object of my invention is to provide a flexible exhaust-pipe joint that is efficient mechanically, gas-tight, and long-lived in service. Underlying my invention is the discovery that, contrary to the expectations of those skilled in the art, chromium may be employed to provide rubbing surfaces of the characteristics required for such a flexible joint. Polished chromium surfaces coact with exceedingly low friction, withstand high temperatures, and resist over long periods of time the corrosive constituents of an engine exhaust. A more particular object of my invention, then, is to provide an effective flexible joint incorporating chromium rubbing surfaces.

The above and other objects of the invention will be apparent in the description to follow, considered with the accompanying drawing.

In the drawing which is to be taken as illustrative only:

Fig. 1 is a side elevation of a portion of an aircraft showing the invention incorporated in an exhaust system;

Fig. 2 is a section on an enlarged scale taken as indicated by the line 2—2 of Fig. 1, a portion of the view being in side elevation;

Fig. 3 is a transverse section taken as indicated by the line 3—3 of Fig. 2;

Fig. 4 is a greatly enlarged fragmentary section taken as indicated by the line 4—4 of Fig. 2;

Fig. 5 is a fragmentary section on a greatly enlarged scale taken as indicated by the line 5—5 of Fig. 2; and Fig. 6 is a section taken as indicated by the line 6—6 of Fig. 5.

Shown in dash-lot lines in Fig. 1 is a fragmentary portion of an aircraft structure, generally designated 10, an aircraft engine 11, and a propeller 12 driven by the engine. Part of the aircraft structure 10 is a framework including arms 13 and a ring 15 for direct support of the engine 11, the engine being resiliently and flexibly mounted on the ring member 15 in a well known manner permitting free vibratory movement of the engine relative to the ring.

An exhaust manifold 16, which also has the general configuration of a ring, is rigidly attached to the engine 11 by branches 17 that individually connect with the various exhaust ports of the engine. A flexible exhaust pipe joint, generally designated 20, constructed as taught herein, carries the exhaust gases from the vibratory manifold 16 to an exhaust tail pipe 21 that is rigidly carried by the aircraft structure 10. The preferred form of the flexible joint 20 will now be described.

The manifold 16 terminates in a short exhaust duct 22, and on the end of the exhaust duct is attached in a gas-tight manner a joint element in the form of a ring 23 having a spherical chromium surface 25. The spherical surface 25 may be either concave or convex, but in the instant construction is convex. The tail pipe 21 which constitutes the fixed portion of the exhaust system has on its inlet end a joint element in the form of a ring 26 having a spherical chromium surface 27. This second spherical surface 27 may also be either concave or convex, but is shown as concave in the drawing. The ring 26 may constitute a flared portion of a sheet metal collar 28 that nests into the end of the tail pipe 21 and is welded or otherwise secured to the tail pipe in a gas-tight manner.

The body of the flexible joint 20 is preferably extensile axially and may consist of two slidingly telescoped cylinders 30 and 31 having overlapping portions 32 and 33 respectively. It is contemplated that the overlapping portions 32 and 33 will have chromium rubbing surfaces that fit together sufficiently close to substantially preclude any gas leakage.

At the outer end of the cylinder 30 is fixed a joint element in the form of a ring 35 having a spherical concave chromium surface 36 complementary to the convex spherical surface of the previously mentioned ring 23. The ring 35 may be the flared portion of a sheet metal collar 37 that is fixedly telescoped into the end of the cylinder 30. To cooperate with the fixed ring 26 on the inlet end of the tail pipe 21 the second cylinder 31 of the joint 20 has at its outer end a joint element in the form of a ring 38 having a convex spherical chromium surface 40 that is complementary to the previously mentioned spherical surface 27.

The above described construction comprises in essence a cylindrical joint body having ball-and-socket connections with the adjacent portions of the exhaust duct, each pair of the coacting joint elements or rings constituting in effect a universal joint. All of the described spherical surfaces are formed on centers of curvature lying on the axis of the exhaust duct so that intimate contact precluding gas leakage may be maintained over the range of angles through which the joint may be disposed by vibratory movement of the engine 11 relative to the aircraft structure 10.

Various expedients may be employed to maintain the required intimate mutual contact of the coacting spherical surfaces 25 and 36 at one end of the joint 20 and of the coacting spherical surfaces 27 and 40 at the other end of the joint. In the particular construction shown in the drawing, the means for maintaining the required intimate contact comprises yielding means in the form of a series of helical springs 41 that tend to spread the two cylinders 30 and 31 axially apart.

The springs 41 may be mounted on the joint in any suitable manner. In the particular construction shown, a plurality of brackets, generally designated 42, in this case three brackets, are mounted on the periphery of the cylinder 30 and are paired with a second plurality of similar brackets, generally designated 43, on the periphery of the cylinder 31. Each of the brackets 42 carries a stud 45 that telescopes into a stud 46 carried by the corresponding bracket 43, and each of the springs 41 is mounted on one of these coacting pairs of studs in compression between the corresponding brackets.

The brackets 42 and 43 may have various constructions. In the particular arrangement shown in the drawing, each bracket 42 or 43 includes a pair of small projecting plates 47 that have overhanging portions 48 spaced apart to form a radial slot 50, the slot being dimensioned to receive a reduced end 51 of one of the studs 45 or 46. Each of the small projecting plates 47 is braced by a wing 52, and for further reenforcement a washer 53 is welded across each pair of the plates 47, the washer having a slot 55 registering with the previously mentioned slot 50.

To assemble one of the studs 45 or 46 to one of the brackets 42 or 43, a washer 56 is placed on the reduced end 51 of the stud against an annular shoulder 57 of the stud and then the stud is moved into the slots 50 and 55. A castellated nut 58 is then threaded onto the reduced end 51 of the stud and anchored by a suitable cotter pin 59. The washer 56 is cut away to provide straight edges 60 (Fig. 5), complementary to the inner edges of the projecting plates 47, and in its final assembled disposition is in the plane of the projecting plates 47 to be retained by the overhanging portions 48.

It is apparent that the three springs 41 in continuously tending to extend the body of the flexible joint 20 cause the described ball-and-socket members at the ends of the joints to maintain effective sealing contact at all the angles to which the joint may be disposed in service. Although sufficient pressure is applied to prevent any intolerable gas leakage, the joint moves freely because polished chromium surfaces in mutual contact develop little friction even under relatively high pressure.

While the relatively movable parts of the described joint construction may be made of a suitable chromium alloy with suitably polished surfaces, I prefer to fabricate the joint from steel, for example, stainless steel, and to apply chromium plating wherever surfaces rub together. Thus in Fig. 4 I show chromium plating 61 on the periphery of the cylinder 30, chromium plating 62 on the complementary inner surface of the cylinder 31, chromium plating 63 on the spherical surface 40 of the ring 38, and chromium plating 64 on the complementary spherical surface 27 of the ring 26.

The construction described in specific detail herein for the purpose of illustration will suggest to those skilled in the art various changes and modifications. The right is reserved to all such departures from the described construction that properly come within the scope of the appended claims.

I claim as my invention:

1. In an internal combustion engine exhaust duct subject to the action of hot corrosive gases, the combination of: a first hollow body fixed relative to the engine and forming a portion of said duct; a second hollow body forming an adjacent portion of said duct; and means to prevent the corrosive action of said gases comprising a first spherical chromium sealing surface concentric to a center in said duct at one end of said first hollow body, and a second spherical chromium sealing surface concentric to said center at the adjacent end of said second hollow body, said second sealing surface being complementary to and in frictional contact with said first sealing surface.

2. In an internal combustion engine exhaust duct subject to the action of hot corrosive gases, the combination of: a first hollow body forming a portion of said duct; a second hollow body forming an adjacent portion of said duct, said first hollow body being telescoped into said second hollow body for relative movement to permit extension and contraction of the duct incidental to engine vibration; and means to prevent the corrosive action of said gases comprising a first cylindrical chromium sealing surface on the outside of said first hollow body concentric to a center in said duct, and a second cylindrical chromium sealing surface on the inside of an adjacent portion of said second hollow body concentric to said center, said second sealing surface being complementary to and in frictional contact with said first sealing surface.

WILLIAM L. LEWIS.